United States Patent
Li

(10) Patent No.: US 11,550,554 B2
(45) Date of Patent: Jan. 10, 2023

(54) MERGED MACHINE-LEVEL INTERMEDIATE REPRESENTATION OPTIMIZATIONS

(71) Applicant: Microsoft Technology Licensing, LLC, Redmond, WA (US)

(72) Inventor: Xiang Li, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 17/144,065

(22) Filed: Jan. 7, 2021

(65) Prior Publication Data
US 2022/0214866 A1 Jul. 7, 2022

(51) Int. Cl.
*G06F 9/44* (2018.01)
*G06F 8/41* (2018.01)
*G06F 9/30* (2018.01)

(52) U.S. Cl.
CPC ............ *G06F 8/433* (2013.01); *G06F 8/443* (2013.01); *G06F 9/30101* (2013.01)

(58) Field of Classification Search
CPC ..................................................... G06F 8/443
USPC ....................................................... 717/155
See application file for complete search history.

(56) References Cited

U.S. PATENT DOCUMENTS

| | | | |
|---|---|---|---|
| 5,966,539 A | 10/1999 | Srivastava | |
| 6,247,174 B1 | 6/2001 | Santhanam et al. | |
| 6,751,792 B1 * | 6/2004 | Nair | G06F 8/443 717/161 |
| 7,146,606 B2 | 12/2006 | Mitchell et al. | |
| 7,530,062 B2 * | 5/2009 | Aronson | G06T 15/005 717/154 |
| 8,146,070 B2 * | 3/2012 | Archambault | G06F 8/443 717/157 |
| 8,296,748 B2 * | 10/2012 | Cheng | G06F 8/433 717/146 |

(Continued)

OTHER PUBLICATIONS

Assignment 3: IR and CFG Generation, Retrieved from: https://web.archive.org/web/20041231092355/http://www.cs.cornell.edu/courses/cs412/2002sp/pa/pa3.html, Dec. 31, 2004, 3 Pages.

(Continued)

*Primary Examiner* — Francisco J Aponte
(74) *Attorney, Agent, or Firm* — Newport IP, LLC; Jacob P. Rohwer

(57) ABSTRACT

A computer device is provided that includes a processor configured to receive a source code for a program including at least two code files, and process the source code for the program to generate a machine-level code file for each of the at least two code files of the source code. The processor is further configured to generate control flow graph data for each machine-level code file generated for the at least two code files of the source code, generate a machine-level intermediate representation for each machine-level code file using a machine-level code file and the generated control flow graph data for that machine-level code file, merge the machine-level intermediate representations into a merged machine-level intermediate representation, and perform machine-level optimizations on the merged machine-level intermediate representation and output an optimized merged machine-level intermediate representation.

20 Claims, 7 Drawing Sheets

(56) References Cited

U.S. PATENT DOCUMENTS

| | | | |
|---|---|---|---|
| 8,539,463 B2* | 9/2013 | De | G06F 8/427 |
| | | | 717/146 |
| 8,689,199 B2* | 4/2014 | Aronson | G06T 15/005 |
| | | | 717/154 |
| 8,806,458 B2* | 8/2014 | Glaister | G06F 8/453 |
| | | | 717/149 |
| 9,367,292 B2* | 6/2016 | Kruglick | G06F 9/45525 |
| 9,411,715 B2* | 8/2016 | Susnea | G06F 12/023 |
| 9,417,857 B2* | 8/2016 | Chafi | G06F 8/41 |
| 9,430,199 B2* | 8/2016 | Glaister | G06T 15/005 |
| 9,529,575 B2* | 12/2016 | Glaister | G06F 8/456 |
| 9,696,966 B2* | 7/2017 | Edwards | G06F 8/30 |
| 9,697,021 B2* | 7/2017 | Kantamneni | G06F 9/45516 |
| 9,824,484 B2* | 11/2017 | Oneppo | G06F 9/541 |
| 10,025,571 B1* | 7/2018 | Boulos | G06F 8/443 |
| 10,133,560 B2 | 11/2018 | Larin et al. | |
| 10,191,725 B2* | 1/2019 | Nay | G06F 8/443 |
| 10,324,741 B2* | 6/2019 | Westrelin | G06F 9/4552 |
| 10,365,902 B2* | 7/2019 | Slesarenko | G06F 8/44 |
| 10,409,571 B1* | 9/2019 | Targowski | G06F 9/522 |
| 10,409,966 B2* | 9/2019 | Gu | G06F 8/41 |
| 10,481,883 B2* | 11/2019 | Ishii | G06F 8/4441 |
| 10,489,131 B2 | 11/2019 | Ishii et al. | |
| 10,884,764 B1* | 1/2021 | Pilkington | G06F 9/45508 |
| 10,887,235 B2* | 1/2021 | Thambidorai | G06F 9/4494 |
| 11,106,437 B2* | 8/2021 | Pelton | G06F 7/14 |
| 2005/0071827 A1* | 3/2005 | Lai | G06F 8/443 |
| | | | 717/146 |
| 2009/0241098 A1 | 9/2009 | Lobo et al. | |
| 2010/0023931 A1* | 1/2010 | Cheng | G06F 8/433 |
| | | | 717/156 |
| 2014/0082597 A1* | 3/2014 | Chafi | G06F 9/45516 |
| | | | 717/148 |
| 2016/0062878 A1* | 3/2016 | Westrelin | G06F 9/4552 |
| | | | 717/130 |
| 2016/0210216 A1 | 7/2016 | Monahan et al. | |
| 2016/0357530 A1* | 12/2016 | Cheng | G06F 8/47 |
| 2017/0139694 A1* | 5/2017 | Larin | G06F 8/4435 |
| 2017/0235670 A1* | 8/2017 | Dominguez | G06F 8/447 |
| | | | 717/140 |
| 2018/0129490 A1* | 5/2018 | Kalpathi Easwaran | G06F 8/54 |
| 2018/0275976 A1* | 9/2018 | Edler Von Koch | G06F 8/443 |
| 2019/0042217 A1* | 2/2019 | Glossop | G06F 8/441 |
| 2019/0042218 A1* | 2/2019 | Zhang | G06F 8/433 |
| 2020/0257510 A1* | 8/2020 | Deodhar | G06F 9/3867 |
| 2020/0301681 A1* | 9/2020 | Haehnle | G06F 8/433 |
| 2020/0310768 A1* | 10/2020 | Zhang | G06F 8/43 |
| 2020/0326917 A1* | 10/2020 | Daultani | G06F 8/443 |
| 2021/0240456 A1* | 8/2021 | Dwars | G06F 8/72 |
| 2021/0365253 A1* | 11/2021 | Zhai | G06F 8/45 |
| 2021/0373865 A1* | 12/2021 | Korsa | G06F 9/3887 |
| 2022/0164169 A1* | 5/2022 | Lee | G06F 8/35 |

OTHER PUBLICATIONS

Matching source-level CFG basic blocks to LLVM IR basic blocks, Retrieved from: https://web.archive.org/web/20180509172804/http://adamrehn.com/articles/matching-cfg-blocks-to-basic-blocks/, May 9, 2018, 8 Pages.

Black, Paul, "Achieving the best performance and code size using Link Time Optimization in Arm Compiler 6", Retrieved from: https://community.arm.com/developer/tools-software/tools/b/tools-software-ides-blog/posts/achieving-best-performance-using-link-time-optimization-in-arm-compiler-6, Jul. 27, 2017, 9 Pages.

Hausmann, Simon, "Reducing Application Size using Link Time Optimization", Retrieved from: https://www.qt.io/blog/2019/01/02/qt-applications-lto, Jan. 2, 2019, 11 Pages.

Dinechin, et al., "Code Generator Optimizations for the ST120 DSP-MCU Core", In Proceedings of the International Conference on Compilers, Architecture, and Synthesis for Embedded Systems, Nov. 17, 2000, pp. 93-102.

"International Search Report and Written Opinion Issued in PCT Application No. PCT/US21/060916", dated Mar. 14, 2022, 13 Pages.

Sutter, et al., "Link-Time Compaction and Optimization of ARM Executables", In Journal of ACM Transactions on Embedded Computing Systems, vol. 6, Issue 1, Feb. 2007, pp. 1-43.

* cited by examiner

MERGED MACHINE-LEVEL INTERMEDIATE REPRESENTATION OPTIMIZATIONS

BACKGROUND

Programming languages that compile programs on a file-by-file basis may separately compile each file of the source code into object files, and then merge the separate object files into an executable file. In some examples, the compiler may employ link-time optimization (LTO) techniques to apply interprocedural optimizations to eliminate duplicate calculations, inefficient use of memory, and other optimizations to the source code as a whole.

SUMMARY

A computer device is disclosed herein that comprises a processor configured to execute instructions that include a compiler configured to receive a source code for a program including at least two code files, and process the source code for the program to generate a machine-level code file for each of the at least two code files of the source code. The instructions further include a control flow graph generator configured to generate control flow graph data for each machine-level code file generated for the at least two code files of the source code. The instructions further include a machine-level intermediate representation generator configured to generate a machine-level intermediate representation for each machine-level code file using a respective machine-level code file and the generated control flow graph data for that machine-level code file. The instructions further include a machine-level intermediate representation merger tool configured to merge the machine-level intermediate representations into a merged machine-level intermediate representation. The instructions further include a machine-level optimization tool configured to perform machine-level optimizations on the merged machine-level intermediate representation and output an optimized merged machine-level intermediate representation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Compilers typically optimize each source code file separately on a file-by-file basis, translating the source code, which may, for example, be written in C, C++, or another programming language, into an executable and linkable format (ELF) file that includes object code. At link time, a linker tool of the compiler merges all of the ELF object files into an executable file. The linking process may include resolving symbol references and relocations, as well as other processes. However, performing file-by-file compilation in this manner may potentially cause the compiler to miss the optimization opportunities that are present in the program as a whole after linking, such as cross-module inlining and other optimizations.

Compilers may implement link-time optimization (LTO) techniques to apply interprocedural optimizations to eliminate duplicate calculations, inefficient use of memory, and other optimizations to the source code as a whole. However, LTO typically requires the generation of bitcode (also called bytecode) files that are used to describe a high-level intermediate representation (IR) for each of the source code files. These bitcode files contain more information regarding the source code files than an executable and linkable format (ELF) object, or other types of executable formats. The compiler may merge the high-level IR at link-time, and performs link-time optimizations on the merged IR.

By performing the optimizations on the merged IR, the compiler may potentially identify optimization opportunities for the program as a whole that would not have been identifiable when analyzing and optimizing each file separately. The optimized merged IR may then be compiled into machine code for the executable. However, these LTO techniques require the generation of the bitcode files for the high-level IR of each source code file, which requires additional backend pipelines to be loaded by the compiler. Further, these extra bitcode files for the high-level IR are stored in memory, which causes the memory footprint to be larger during compiling. The additional code generation and optimizations that are performed for LTO will cause additional overhead that slows down the link-time process. While the additional overhead, increased memory footprint, and increased time required for linking may be acceptable for non-runtime compilation, these issues may potentially degrade the performance of just-in-time compilation that may, for example, be used for shader program compilation.

Figure 1:
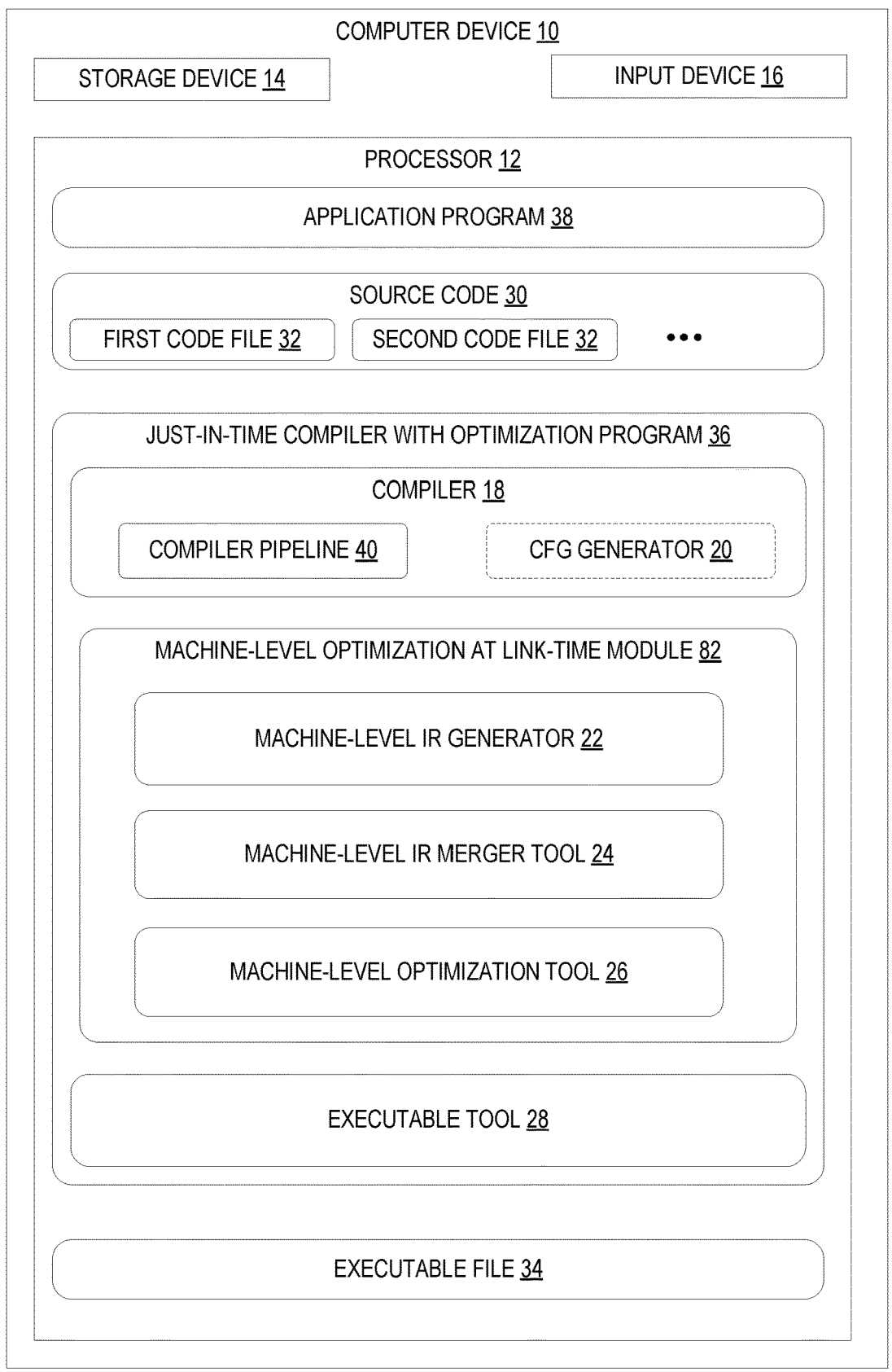
FIG. 1 shows a computer device that implements a machine-level intermediate representation (IR) optimization process, according to one embodiment of the subject disclosure.

To address these issues, FIG. 1 illustrates a computer device 10 that implements a machine-level IR optimization process that may provide the potential benefit of reducing computational overhead and memory footprint for performing optimizations compared to conventional LTO techniques. As illustrated, the computer device 10 includes a processor 12 configured to execute instructions stored in memory by one or more storage devices 14. The one or more storage devices 14 may include volatile and non-volatile memory devices. The computer device 10 may further include an input device 16, and other suitable computer components.

The instructions executed by the processor 12 include program modules for a compiler 18, a control flow graph (CFG) generator 20, a machine-level intermediate representation generator 22, a machine-level intermediate merger tool 24, an optimization tool 26, and an executable tool 28. In one example, these program modules may be separate from each other and arranged in a pipeline to perform the functions described herein. In another example, one or more of these program modules may be integrated together. For example, the CFG generator 20 may be included in the compiler 18, and may perform the functions of the CFG generator 20 described herein during execution of the compiler 18.

The processor 12 is configured to compile source code 30, which includes two or more code files 32, into an executable file 34, as will be discussed in more detail below. In one example, the source code 30 may be compiled using static compilation techniques. That is, the source code 30 may be compiled into the executable file 34 during a compile-time, and the resulting executable file 34 may be stored and executed at a later point in time.

In another example, the source code 30 may be compiled using just-in-time or dynamic compilation techniques. In this example, the compiler 18, the CFG generator 20, the machine-level IR generator 22, the machine-level IR merger tool 24, and the machine-level optimization tool 26, may be included in a just-in-time (JIT) compiler with optimization program 36. In contrast to static compilation, the JIT compiler with optimization program 36 may be configured to compile the source code 30 during run-time of an application program that includes the source code 30. In this example, the processor 12 is configured to execute an application program 38 that generates the source code 30 for a program at run-time of the application program 38. The processor 12 is further configured to execute the JIT compiler with optimization program 36 to compile the source code 30 at run-time of the application program 38, including executing instructions for the compiler 18, the CFG generator 20, the machine-level IR generator 22, the machine-level IR merger tool 24, the machine-level optimization tool 26, and the executable tool 28.

As a specific example, the application program 38 may take the form of a game application or another type of application that generates code for shader programs that are compiled and executed at run-time. In this example, the source code 30 is for a shader program that is generated at run-time of the application program 38. The source code 30 for the shader program is compiled by the JIT compiler with optimization program 36, which generates an executable file 34. The executable file 34 for the shader program is executed, such as, for example, by a graphics processing unit (GPU), and a result is sent back to the application program 38.

In the example illustrated in FIG. 1, the source code 30 includes at least two code files 32. However, it should be appreciated that the source code 30 may include a larger number of code files 32, such as a hundred code files, a thousand code files, etc. For example, the source code 30 for a shader program may include a multitude of code files 32 that will be compiled file-by-file into the executable file 34.

In the static and dynamic compilation examples, the compiler 18 is configured to receive the source code 30 for processing. The source code 30 may be compiled file-by-file using a compiler pipeline 40 of the compiler 18. An example compiler pipeline 40 is shown in FIG. 2.

Figure 2:
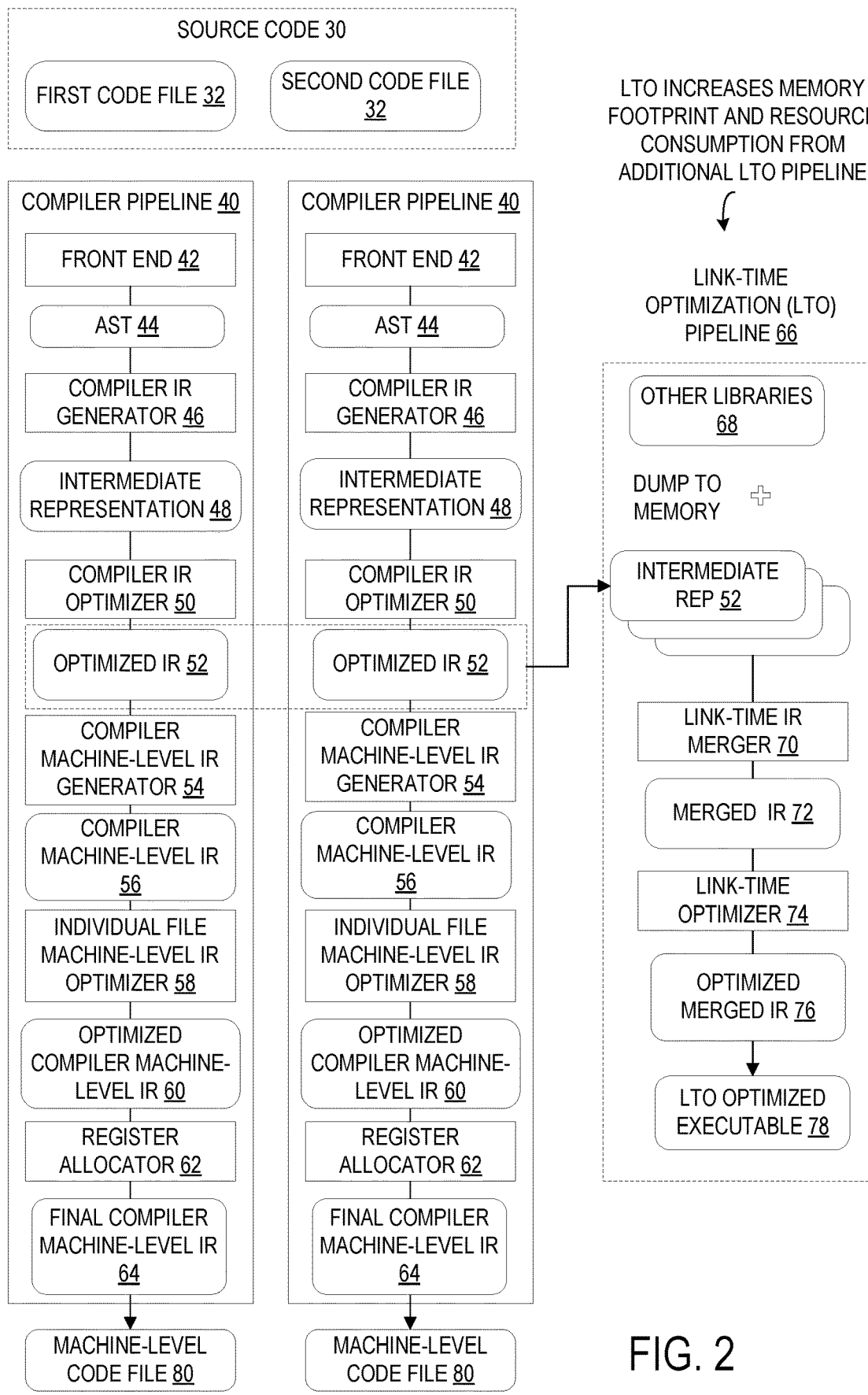
FIG. 2 shows an example compiler pipeline compiling code files of a source code into machine-level code files implemented by the computer device of FIG. 1.

In the example illustrated in FIG. 2, each code files 32 of the source code 30 is separately processed by a compiler pipeline 40 of the compiler 18. It should be appreciated that the compiler pipeline 40 shown in FIG. 2 is merely exemplary, and that the compiler 18 may implement other architectures for the computer pipeline 40.

Each respective code file 32 is processed by a front end 42 of the compiler 18. The front end 42 analyzes the code file 32 and divides the program into core parts, and checks for syntax, grammar, lexical, and other types of errors. The front end 42 also generates an abstract syntax tree (AST) 44 for the code file 32 of the source code 30. The abstract syntax tree 44 is generated to represent a structure of the program code. Typically, each node of the AST 44 denotes a construct occurring in the source code.

A compiler intermediate representation (IR) generator 46 may use the AST 44 to generate an IR 48 for the code file 32. Example IR formats may include Byte Code for Java, or a language independent format such as three-address code, or another type of IR format. These IRs are typically close to the source language itself of the source code 30 as compared to a lower level IR that is closer to a target machine that the executable will be run on. In some examples, the IR 48 may take the form of a medium-level IR that is between a high-level IR and a low-level IR, and is independent of the language of the source code and the target machine that the program will be executed on.

In a link-time optimization (LTO) implementation, the IR 48 for each code file 32 of the source code 30 will typically be dumped into memory on a file-by-file basis. Thus, when performing LTO, an IR 48 for every code file 32 of the source code 30 will be dumped into memory, which will increase the memory footprint used during compilation of the source code 30, and further increase resource consumption by adding an LTO pipeline 66 that is required to perform LTO functions. The LTO pipeline 66 increases the overhead of the compilation of the source code 30. For example, the LTO pipeline 66 may require all of the IRs 48 for all of the code files 32 of the source code 30 to be dumped into memory along with other libraries 68 that may be used by those code files 32. These IRs 48 are typically generated to be close to the source language, and have a larger memory footprint than lower-level IRs that are closer to the machine-level of the target machine. Typically, the IRs 48 may be optimized individually before LTO is performed.

The IRs 48 for each code file 32 of the source code 30 and the other libraries 68 are processed by a link-time IR merger 70 of the LTO pipeline 66. The link-time IR merger 70 generates a merged IR 72 that includes code from all of the IRs 48. The merged IR 72 is sent to a link-time optimizer 74 of the LTO pipeline 66. The link-time optimizer 74 analyzes and optimizes the program as a whole, and may perform different interprocedural optimizations, such as, for example, reducing duplicate calculations, reducing inefficient use of memory, and simplifying iterative loops. The resulting optimized merged IR 76 may then be directly compiled into an LTO optimized executable 78.

However, as discussed above, implementing LTO in this manner may increase the memory footprint used by the compiler, and requires additional overhead for the LTO pipeline 66 that may consume additional computer resources. These issues are increasingly detrimental for just-in-time compilation scenarios such as run-time shader program compilation and execution.

To address these issues regarding increased memory footprint and overhead caused by typical LTO implementations, the computer device 10 does not implement LTO, and instead implements a machine-level optimization at link-time module, which will be discussed in more detail below. Thus, the compiler 18 implemented by the computer device 10 does not store IRs 48 of each code file 32 of the source code 30 in memory, and does not perform link-time optimization 78 using the IRs 48 of each code file 32 of the source code 30. As discussed above, these IRs 48 of the compiler are high-level IRs or mid-level IRs that are higher than machine-level, and thus have a larger memory footprint compared to machine-level IRs. Instead, the computer device 10 will continue with the file-by-file compilation of each code file 32 of the source code 30 using the compiler pipeline 40 shown in FIG. 2.

The IR 48 for each code file 32 may be processed by a compiler IR optimizer 50 on a file-by-file basis. That is, the compiler IR optimizer 50 does not optimize the program as a whole, but optimizes each code file 32 on a file-by-file basis. However, due to processing each code file 32 separately, a plurality of IRs 48 for every code file 32 of the source 30 does not need to be dumped concurrently to memory, which will reduce the memory footprint compared to LTO techniques. The compiler IR optimizer 50 will typically perform higher-level optimizations related to the code itself, rather than target machine specific optimizations.

The optimized IR 52 is sent to a compiler machine-level IR generator 54, which generates a compiler machine-level IR 56 for that code file 32. The compiler machine-level IR 56 is a reduced version of the high-level IR where high-level language features are lowered to simpler constructs. The compiler machine-level IR 56 is low-level IR that is closer to the level of the target machine that the program will be run on.

An individual file machine-level IR optimizer 58 may process the compiler machine-level IR 56 for each code file 32, and may perform optimizations that are more specific to the machine-code and the architecture of the target machine on which the program will ultimately be executed. The individual file machine-level IR optimizer 58 may generate an optimized compiler machine-level IR 60 for the code file 32. The compiler pipeline 40 may then use a register allocator 62 to allocate registers for the optimized compiler machine-level IR 60, and produce a final compiler machine-level IR 64. The final compiler machine-level IR 64 may then be compiled into a machine-level code file 80 for that code file 32, which includes operation code for the program. Each code file 32 of the source code 30 may be compiled on a file-by-file basis into respective machine-level code files 80. Typically, these machine-level code files 80 would be linked into an executable file that would then be executed on the target machine.

However, as illustrated in FIG. 1, the computer device 10 implements a machine-level optimization at link-time module 82 to perform further machine-level optimizations on the machine-level code files 80 at link-time. The machine-level optimization at link-time module 82 takes as input, a machine-level code file 80 for each of the code files 32 of the source code 30 that are generated by the compiler 18. The machine-level optimization at link-time module 82 also takes as input control flow graph data 82 for each machine-level code file 80 generated for the at least two code files 32 of the source code 30. The control flow graph data 82 may be generated by the CFG generator 20. As discussed above, in one example, the CFG generator 20 may use the AST 44 generated by the compiler 18 to produce the control flow graph data 82. However, it should be appreciated that the CFG generator 20 may implement other types of flow-sensitive analysis techniques to generate the control flow graph data 82. Typically, the control flow graph data 82 may define edges for a set of basic blocks of code of the machine-level code files 80. The control flow graph data 82 may define how the blocks of code are connected to one another.

Each machine-level code file 80 and corresponding control flow graph data 82 is sent to the machine-level optimization at link-time module 82, which will link and optimize the files, and generate an executable file 34 for the source code 30 as a whole using an executable tool 28. One example pipeline for the machine-level optimization is illustrated in FIG. 3.

Figure 3:
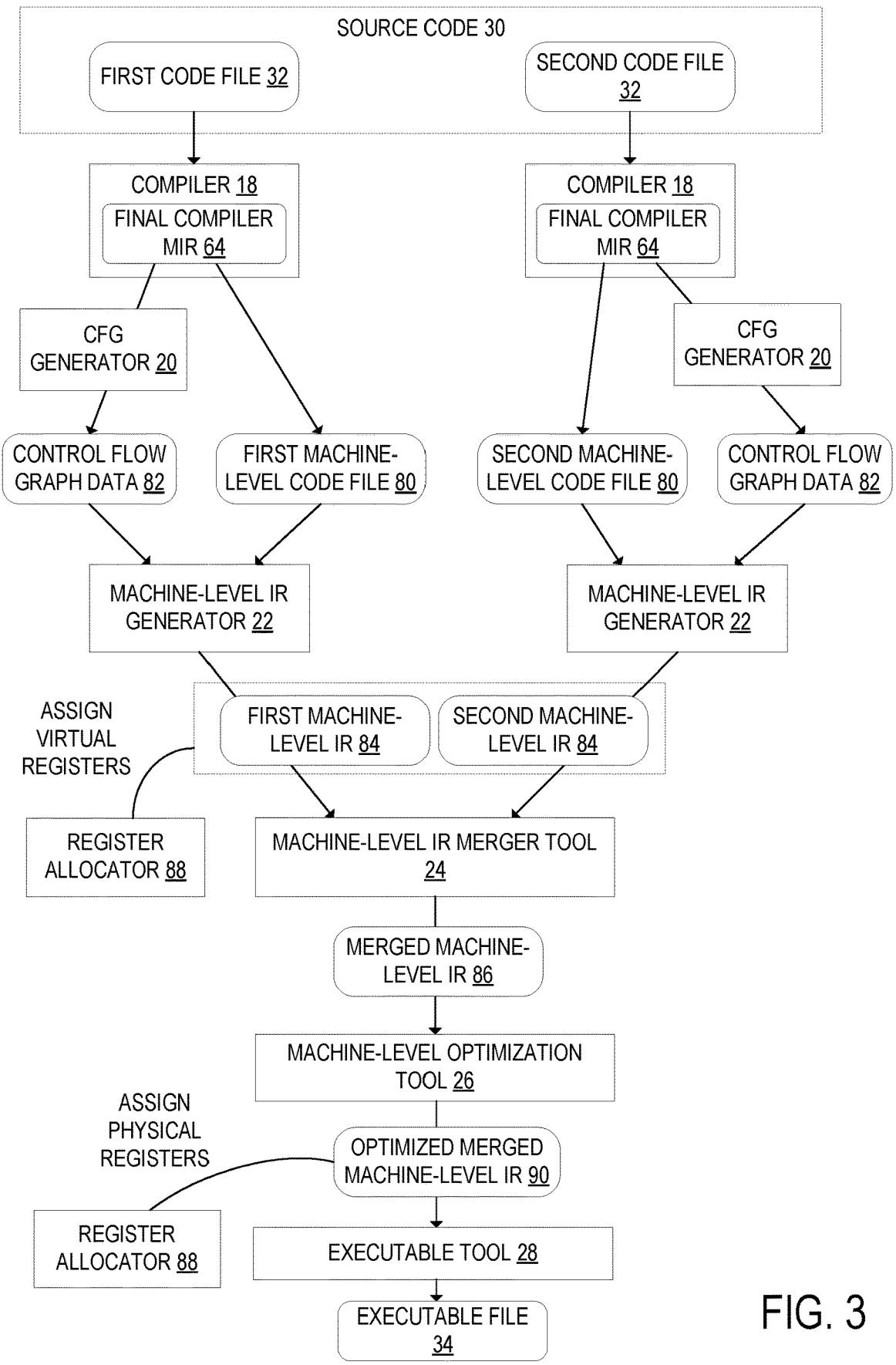
FIG. 3 shows a data flow for the machine-level IR optimization process implemented by the computer device of FIG. 1.

As shown in FIG. 3, each code file 32 of the source code 30 may be compiled by the compiler 18 into respective machine-level code files 80 using the compiler pipeline 40 described above and illustrated in FIG. 2. The CFG generator 20 may perform flow analysis on the final compiler machine-level IR 64 to generate control flow graph data 82 for each of the machine-level code files 80.

The machine-level IR generator 22 of the machine-level optimization at link-time module 82 is configured to receive the machine-level code file 80 for a code file 32, and control flow graph data 82 generated by the CFG generator 20 for that machine-level code file 80. The machine-level IR generator 22 may then generate a machine-level IR 84 for each machine-level code file 80 using a respective machine-level code file 80 and the generated control flow graph data 82 for that machine-level code file 80.

Each machine-level code file 80 typically includes a plurality of operation code, which is a basic computer operation in the instruction set of the target machine. Operation code, also known as instruction machine code, instruction code, instruction syllable, instruction parcel, or opstring, specifies the operation to be performed. Operation code may also specify the data that will be processed in the form of operands. The machine-level code files 80 may include machine-level code that is patterned to suit the architecture of the particular processor that the code will be executed on. In some examples, the operation code may use assembly language that has a strong correspondence between the instructions in the assembly language and the architecture's machine code instructions for the processor.

Figure 4:
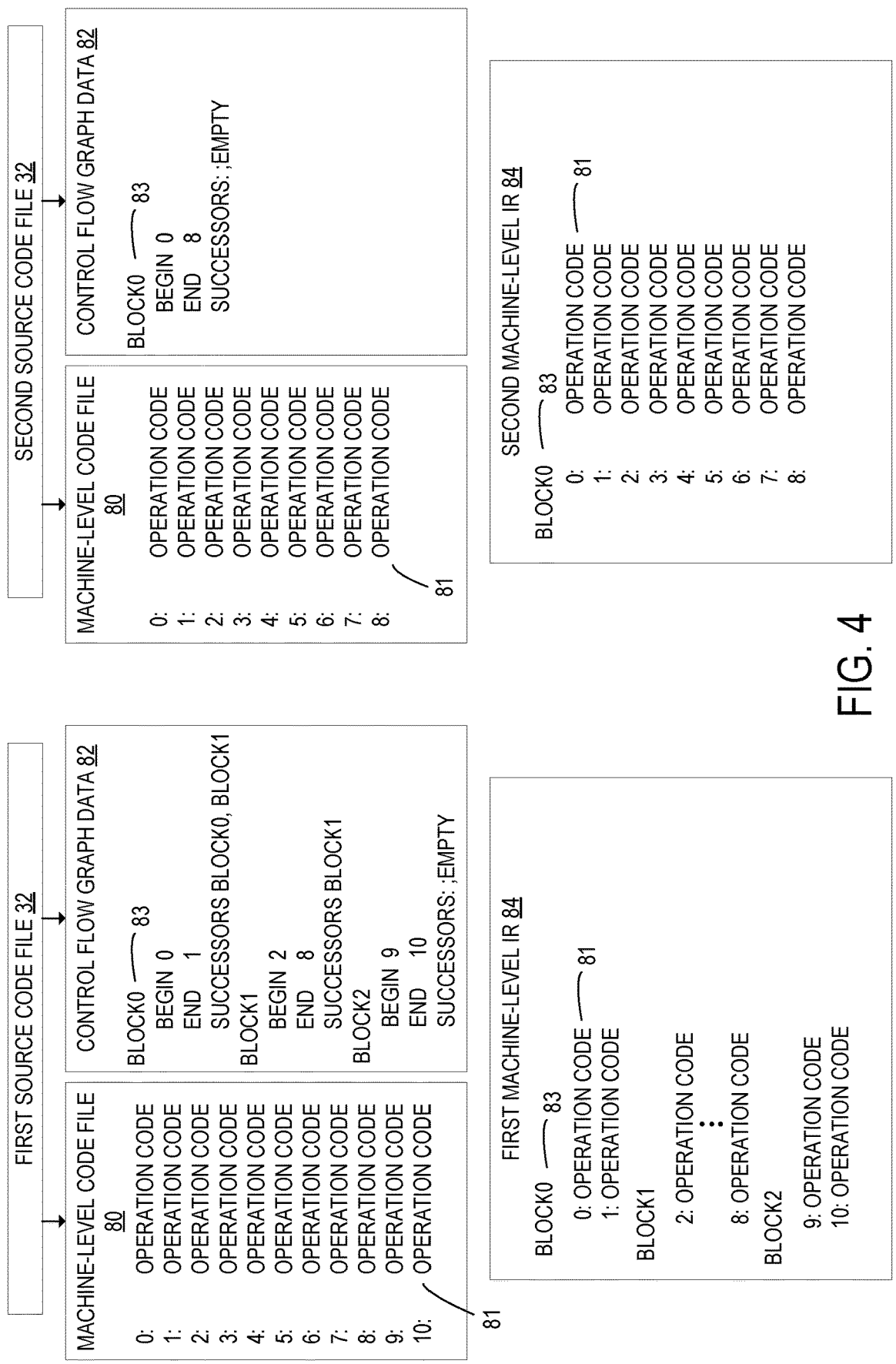
FIG. 4 shows an example of generating machine-level IRs using a machine-level code file and control flow graph data for that machine-level code file for the machine-level IR optimization process implemented by the computer device of FIG. 1.

To generate the machine-level IR 84 for each machine-level code file 80, the machine-level IR generator 22 configured to organize the plurality of operation code of that machine-level code file 80 into one or more code blocks based on the generated control flow graph data 82 for that machine-level code file 80. FIG. 4 illustrates an example of generating machine-level IRs using machine-level code files and control flow graph data for those machine-level code files 80. As shown, each machine-level code file 80 may include a plurality of operation code 81. However, without control flow graph data 82, it would be difficult to determine how the operation code 81 of a first machine-level code file should be merged with the operation code 81 of a second machine-level code file.

As discussed above, the control flow graph data 82 may define edges for a set of basic blocks 83 of code of the machine-level code files 80. The control flow graph data 82 may define how the blocks of code 83 are connected to one another, and may identify successor and terminators for each block of code 83. The machine-level IR generator 22 may use this control flow graph data 82 to group sets of operation code 81 of the first machine-level code file 80 into one or more code blocks 83 with defined succession between the code blocks. Typically, the machine-level IRs 84 are generated by the machine-level IR generator 22 with single static assignment which requires that each variable be assigned exactly once, and that every variable is defined before it is used.

The machine-level IR generator 22 is configured to generate machine-level IRs 84 for each machine level code file 80 on a file-by-file basis. Typically, the machine-level code files 80 generated by the compiler pipeline 40 will have been assigned physical or hardware registers for performing the various operation code in the machine-level code file 80. However, as those physical registers were allocated separately for each code file, there may be memory inefficiencies in the register allocation across the program as a whole. Thus, in one example, a virtual register allocator 88 may be configured to determine a plurality of physical registers that have been allocated to each of the machine-level IRs 84, and assign a plurality of virtual registers for the plurality of physical registers of the machine-level IRs 84. These virtual registers are temporary, and will aid in performing memory optimizations across the program of the source code 30 as a whole.

Figure 5:
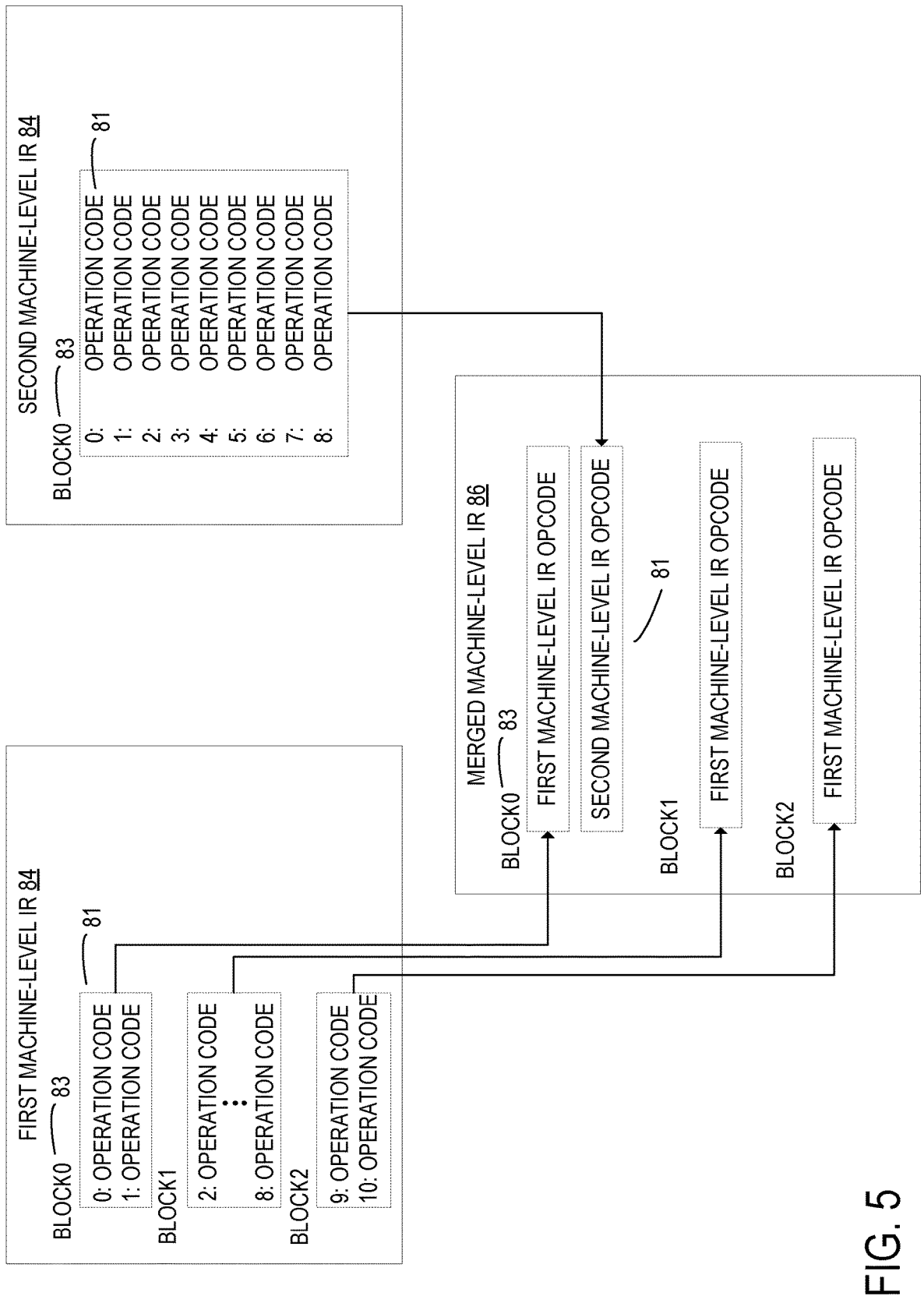
FIG. 5 shows an example of merging two machine-level IRs into a merged machine-level IR for the machine-level IR optimization process implemented by the computer device of FIG. 1.

The set of machine level IRs 84 are then sent to a machine-level IR merger tool 24. The machine-level IR merger tool 24 is configured to merge the machine-level IRs 84 into a merged machine-level IR 86, which may include merging the one or more code blocks of each machine-level IR 84 with corresponding one or more code blocks of each other machine-level IR 84. FIG. 5 illustrates an example of merging two machine level IRs 84 into a merged machine-level IR 86. As shown, the operation code 81 of each machine level IR 84 has been organized into code blocks 83 using the control flow graph data 82 generated by the CFG generator 20. The machine-level IR merger tool 24 may merged each code block, such as BLOCK0, BLOCK1, and BLOCK2 from each machine-level IR 84. That is, the operation code 81 for BLOCK0 in both the first and second machine-level IRs 84 may be merged, such that the BLOCK0 code block of the merged machine-level IR 86 includes operation code 81 from both machine-level IRs 84. This merger process may be performed for each code block 83 across all of the machine-level IRs 84. FIG. 5 shows an example merged machine-level IR 86 generated in this manner from the example first and second machine-level IRs 84.

Turning back to FIG. 3, the merged machine-level IR 86 links the entire program of the source code 30 together into a single code file. Thus, whole program optimizations may be performed on the merged machine-level IR 86, which may provide improved optimizations compared to the individual file optimizations performed by the compiler pipeline 40 discussed above. It should be appreciated that the machine-level IRs 86 have a smaller memory footprint, and are typically more optimized than the high-level IRs 48 used for LTO in FIG. 2. By not performing LTO on high-level IRs, and instead optimizing a merged machine-level IR 86, the computer device 10 may reduce the total memory footprint required for compilation, and reduce the computational overhead incurred for performing these optimizations at link time, while still achieving whole program interprocedural optimizations that increase the efficiency of the resulting executable file 34.

The machine-level optimization tool 26 configured to perform machine-level optimizations on the merged machine-level intermediate representation and output an optimized merged machine-level intermediate representation. The machine-level optimization tool 26 may be configured to perform any suitable interprocedural optimization on the merged machine-level IR 86, such as, for example, reducing duplicate calculations, reducing inefficient use of memory, and simplifying iterative loops.

At this point, the optimized merged machine-level IR 90 includes virtual registers that provide potential improvements for memory optimizations performed by the machine-level optimization tool 26. However, before a working executable file may be generated, physical registers are assigned based on the virtual registers of the IR. In one example, the register allocator 88 is further configured to determine one or more virtual registers that have been assigned to the optimized merged machine-level IR 90, and allocate one or more physical registers to the optimized merged machine-level IR 90 based on the determined one or more virtual registers.

The optimized merged machine-level IR 90 that has been allocated physical registers may then be sent to the executable tool 28, which may be configured to generate an executable file 34 from the optimized merged machine-level IR 90. As discussed above, the source code 40 may be code generated at run-time for a shader program. The computer device 10 may implement the just-in-time compiler with optimization program 36 described above to compile the source code 30 into the executable file 34 at run-time of the application program 38 that generated the shader program. The executable file 34 may then be run, and a result returned to the application program 38. The just-in-time compiler with optimization program 36 described herein provides interprocedural optimizations across the program of the source code 30 as a whole, while achieving a lower memory footprint and computational overhead than conventional LTO techniques that perform optimizations on high-level IRs at link-time.

Figure 6:
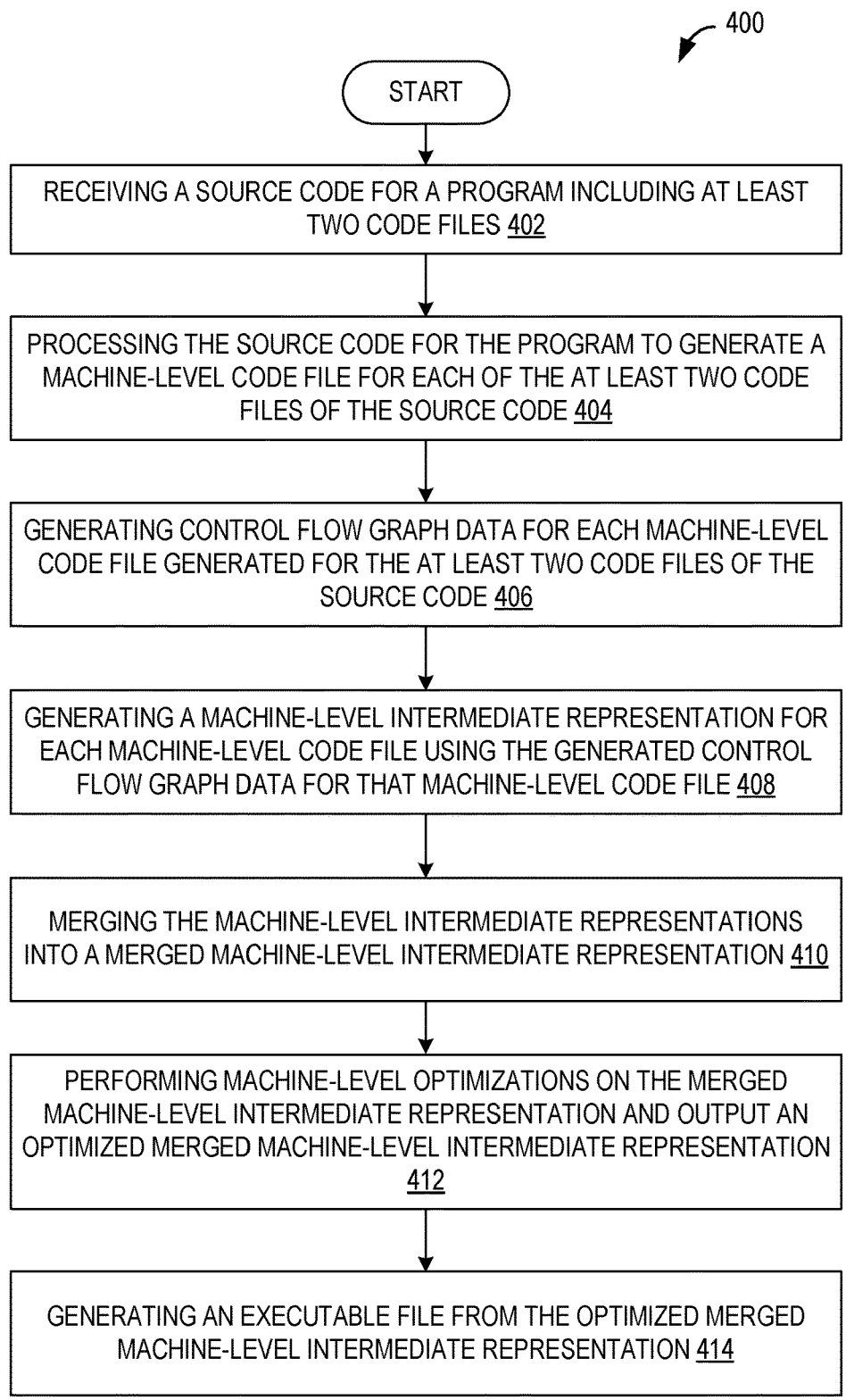
FIG. 6 shows a flowchart for a method for a machine-level IR optimization process that may be implemented by the computer device of FIG. 1.

FIG. 6 shows a flowchart for an example method 400 for performing a machine-level IR optimization process that may provide the potential benefit of reducing computational overhead and memory footprint for performing optimizations compared to conventional LTO techniques. The follow description of method 400 is provided with reference to the software and hardware components described above and shown in FIG. 1. It should be appreciated that method 400 also can be performed in other contexts using other suitable hardware and software components.

At 402, the method 400 may include receiving a source code for a program including at least two code files. In one example, the program is a shader program that is generated at run-time of an application program, and the method 400 is performed at run-time of the application program that generates the source code for the program. Other program types are also possible. In this example, the method 400 may be implemented as a just-in-time compiler for compiling the program generated by the application program at run-time.

At 404, the method 400 may include processing the source code for the program to generate a machine-level code file for each of the at least two code files of the source code. Step 404 may include using a compiler pipeline that includes a compiler front end, a high-level IR generator, a high-level IR optimizer, a mid-level IR generator, a mid-level IR optimizer, a register allocator, and other suitable software components for compiling the code files of the source code into a machine-level code file. An example of a compiler pipeline is described above with reference to FIG. 1.

At 406, the method 400 may include generating control flow graph data for each machine-level code file generated for the at least two code files of the source code. The control flow graph data may be generated based on an abstract syntax tree, or another suitable flow analysis tool generated during compilation of the code file. The control flow graph data typically may define edges for a set of basic blocks of code of the machine-level code files. The control flow graph data may define how the blocks of code are connected to one another.

At 408, the method 400 may include generating a machine-level intermediate representation for each machine-level code file using a respective machine-level code file and the generated control flow graph data for that machine-level code file. Each machine-level code file typically includes a plurality of operation code. Step 408 may be performed by organizing the plurality of operation code of that machine-level code file into one or more code blocks based on the generated control flow graph data for that machine-level code file.

At 410, the method 400 may include merging the machine-level intermediate representations into a merged machine-level intermediate representation. Step 410 may be performed by merging the one or more code blocks of each machine-level intermediate representation with corresponding one or more code blocks of each other machine-level intermediate representation.

At 412, the method 400 may include performing machine-level optimizations on the merged machine-level intermediate representation and outputting an optimized merged machine-level intermediate representation. Step 412 may include any suitable interprocedural optimizations, such as, for example, reducing duplicate calculations, reducing inefficient use of memory, and simplifying iterative loops.

At 414, the method 400 may include generating an executable file from the optimized merged machine-level intermediate representation. The executable file may then be executed on the computer device 10.

In one example, the method 400 is performed without storing high-level intermediate representations of each code file of the source code in memory. Additionally, the method 400 is performed without performing link-time optimization using the high-level intermediate representations of each code file of the source code. An example pipeline for performing LTO using high-level IRs is shown in FIG. 2. As the method 400 is performed without using LTO, and instead by performing interprocedural optimizations across the whole program of the source code at a machine-level, the method 400 provides the potential benefits of achieving a lower memory footprint and computational overhead than conventional LTO techniques that perform optimizations on high-level IRs at link-time. The lower memory footprint and computation overhead provided by method 400 may increase the efficiency and performance of just-in-time compilation used for shader programs and other types of programs that are compiled at run-time.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
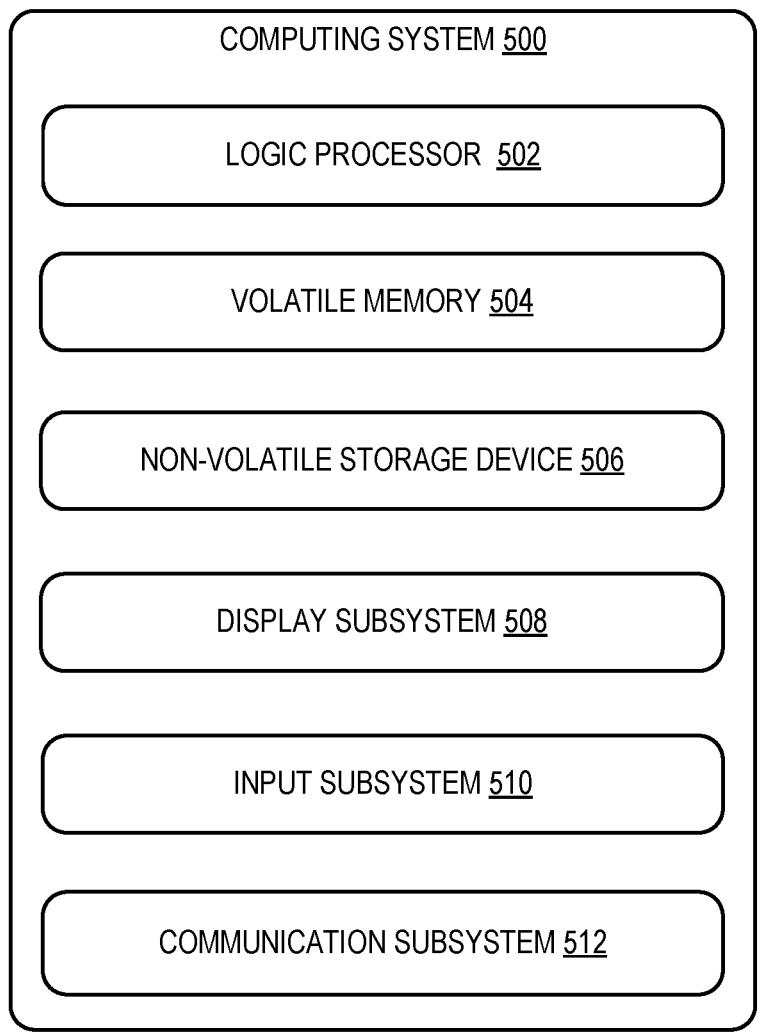
FIG. 7 shows a schematic view of an example computing environment in which the computer device of FIG. 1 may be enacted.

FIG. 7 schematically shows a non-limiting embodiment of a computing system 500 that can enact one or more of the methods and processes described above. Computing system 500 is shown in simplified form. Computing system 500 may embody the computer device 10 described above and illustrated in FIG. 1. Computing system 500 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 500 includes a logic processor 502 volatile memory 504, and a non-volatile storage device 506. Computing system 500 may optionally include a display subsystem 508, input subsystem 510, communication subsystem 512, and/or other components not shown in FIG. 7.

Logic processor 502 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 506 includes one or more physical devices configured to hold instructions executable by the logic processors to implement the methods and processes described herein. When such methods and processes are implemented, the state of non-volatile storage device 506 may be transformed—e.g., to hold different data.

Non-volatile storage device 506 may include physical devices that are removable and/or built in. Non-volatile storage device 506 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 506 may include nonvolatile, dynamic, static, read/write, read-only, sequential-access, location-addressable, file-addressable, and/or content-addressable devices. It will be appreciated that non-volatile storage device 506 is configured to hold instructions even when power is cut to the non-volatile storage device 506.

Volatile memory 504 may include physical devices that include random access memory. Volatile memory 504 is typically utilized by logic processor 502 to temporarily store information during processing of software instructions. It will be appreciated that volatile memory 504 typically does not continue to store instructions when power is cut to the volatile memory 504.

Aspects of logic processor 502, volatile memory 504, and non-volatile storage device 506 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 typically implemented in software by a processor to perform a particular function using portions of volatile memory, which function involves transformative processing that specially configures the processor to perform the function. Thus, a module, program, or engine may be instantiated via logic processor 502 executing instructions held by non-volatile storage device 506, using portions of volatile memory 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 508 may be used to present a visual representation of data held by non-volatile storage device 506. The visual representation may take the form of a graphical user interface (GUI). As the herein described methods and processes change the data held by the non-volatile storage device, and thus transform the state of the non-volatile storage device, the state of display subsystem 508 may likewise be transformed to visually represent changes in the underlying data. Display subsystem 508 may include one or more display devices utilizing virtually any type of technology. Such display devices may be combined with logic processor 502, volatile memory 504, and/or non-volatile storage device 506 in a shared enclosure, or such display devices may be peripheral display devices.

When included, input subsystem 510 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 512 may be configured to communicatively couple various computing devices described herein with each other, and with other devices. Communication subsystem 512 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 500 to send and/or receive messages to and/or from other devices via a network such as the Internet.

The following paragraphs provide additional support for the claims of the subject application. One aspect provides a computer device (10) comprising a processor (12) configured to execute instructions. The instructions include a compiler (18) configured to receive a source code (30) for a program including at least two code files (32), and process the source code (30) for the program to generate a machine-level code file (80) for each of the at least two code files (32) of the source code (30). The instructions further include a control flow graph generator (20) configured to generate control flow graph data (82) for each machine-level code file (80) generated for the at least two code files (32) of the source code (30). The instructions further include a machine-level intermediate representation generator (22) configured to generate a machine-level intermediate representation (84) for each machine-level code file (80) using a respective machine-level code file (80) and the generated control flow graph data (82) for that machine-level code file (80). The instructions further include a machine-level intermediate representation merger tool (24) configured to merge the machine-level intermediate representations (84) into a merged machine-level intermediate representation (86). The instructions further include a machine-level optimization tool (26) configured to perform machine-level optimizations on the merged machine-level intermediate representation (86) and output an optimized merged machine-level intermediate representation (90).

This aspect provides the potential benefits of achieving a lower memory footprint and computational overhead than conventional LTO techniques that perform optimizations on high-level IRs at link-time. The lower memory footprint and computational overhead provided by this aspect may provide the potential benefits of increased efficiency and performance of just-in-time compilation that may be used for shader programs and other types of programs that are compiled at run-time.

In this aspect, additionally or alternatively, the instructions executed by the processor may further include an executable tool configured to generate an executable file from the optimized merged machine-level intermediate representation.

This aspect provides the potential benefit of increasing efficiency in memory utilization and resource consumption of the executable by generating the executable from the optimized merged machine-level intermediate representation that has been interprocedurally optimized.

In this aspect, additionally or alternatively, the processor may be configured to execute an application program that generates the source code for the program at run-time, and the processor may be further configured to execute the instructions for the compiler, the control flow graph generator, the machine-level intermediate representation generator, the machine-level intermediate representation merger tool, and the optimization tool at run-time of the application program.

This aspect provides the potential benefit of decreasing the memory footprint associated with performing whole program optimizations, which enables the whole program optimizations to be performed during just-in-time compilation of a program In this aspect, additionally or alternatively, the program may be a shader program that is generated at run-time of the application program.

This aspect provides the potential benefit of improving the run-time performance of an application that includes shader programs, such as, for example, video games and other visual applications.

In this aspect, additionally or alternatively, the machine-level intermediate representations may be generated by the machine-level intermediate representation generator with single static assignment.

This aspect provides the potential benefit of improved whole program optimizations that may be performed by the machine-level optimization tool on the merged machine-level intermediate representation of the program.

In this aspect, additionally or alternatively, each machine-level code file may include a plurality of operation code.

This aspect provides the potential benefit of increasing efficiency in memory utilization and resource consumption by performing whole program optimizations for machine-level intermediate representations that include operation code for the target machine compared to conventional LTO techniques that use higher-level intermediate representations.

In this aspect, additionally or alternatively, to generate the machine-level intermediate representation for each machine-level code file, the machine-level intermediate representation generator may be configured to organize the plurality of operation code of that machine-level code file into one or more code blocks based on the generated control flow graph data for that machine-level code file.

This aspect provides the potential benefit of increasing optimization opportunities for the machine-level optimization tool to optimize the machine-level code by generating a machine-level intermediate representation.

In this aspect, additionally or alternatively, to merge the machine-level intermediate representations, the machine-level intermediate representation merger tool may be configured to merge the one or more code blocks of each machine-level intermediate representation with corresponding one or more code blocks of each other machine-level intermediate representation.

This aspect provides the potential benefit of improving the whole program optimizations that are performed by the machine-level optimization tool.

In this aspect, additionally or alternatively, the instructions executed by the processor may further include a register allocator configured to determine a plurality of physical registers that have been allocated to each of the machine-level intermediate representations, and assign a plurality of virtual registers for the plurality of physical registers of the machine-level intermediate representations.

This aspect provides the potential benefit of improved memory management optimizations that may be performed by the machine-level optimization tool.

In this aspect, additionally or alternatively, the register allocator may be further configured to determine one or more virtual registers that have been assigned to the optimized merged machine-level intermediate representation, and allocate one or more physical registers to the optimized merged machine-level intermediate representations based on the determined one or more virtual registers.

This aspect provides the potential benefit of improved memory management optimizations that may be performed by the machine-level optimization tool.

In this aspect, additionally or alternatively, the compiler does not store higher than machine-level intermediate representations of each code file of the source code in memory, and does not perform link-time optimization using the higher than machine-level intermediate representations of each code file of the source code.

This aspect provides the potential benefit of increasing efficiency in memory utilization and resource consumption by performing whole program optimizations for machine-level intermediate representations that include operation code for the target machine compared to conventional LTO techniques that use higher-level intermediate representations.

Another aspect provides a method (400) comprising, at processor of a computer device, receiving (402) a source code for a program including at least two code files, processing (404) the source code for the program to generate a machine-level code file for each of the at least two code files of the source code, generating (406) control flow graph data for each machine-level code file generated for the at least two code files of the source code, generating (408) a machine-level intermediate representation for each machine-level code file using a respective machine-level code file and the generated control flow graph data for that machine-level code file, merging (410) the machine-level intermediate representations into a merged machine-level intermediate representation, and performing (412) machine-level optimizations on the merged machine-level intermediate representation and outputting an optimized merged machine-level intermediate representation.

This aspect provides the potential benefits of achieving a lower memory footprint and computational overhead than conventional LTO techniques that perform optimizations on high-level IRs at link-time. The lower memory footprint and computational overhead provided by this aspect may provide the potential benefits of increased efficiency and performance of just-in-time compilation that may be used for shader programs and other types of programs that are compiled at run-time.

In this aspect, additionally or alternatively, the method may further comprise generating an executable file from the optimized merged machine-level intermediate representation.

This aspect provides the potential benefit of increasing efficiency in memory utilization and resource consumption of the executable by generating the executable from the optimized merged machine-level intermediate representation that has been interprocedurally optimized.

In this aspect, additionally or alternatively, the method may be performed at run-time of an application program that generates the source code for the program.

This aspect provides the potential benefit of decreasing the memory footprint associated with performing whole program optimizations, which enables the whole program optimizations to be performed during just-in-time compilation of a program In this aspect, additionally or alternatively, the program may be a shader program that is generated at run-time of the application program.

This aspect provides the potential benefit of improving the run-time performance of an application that includes shader programs, such as, for example, video games and other visual applications.

In this aspect, additionally or alternatively, each machine-level code file may include a plurality of operation code.

This aspect provides the potential benefit of increasing efficiency in memory utilization and resource consumption by performing whole program optimizations for machine-level intermediate representations that include operation code for the target machine compared to conventional LTO techniques that use higher-level intermediate representations.

In this aspect, additionally or alternatively, generating the machine-level intermediate representation for each machine-level code file may include organizing the plurality of operation code of that machine-level code file into one or more code blocks based on the generated control flow graph data for that machine-level code file.

In this aspect, additionally or alternatively, merging the machine-level intermediate representations may include merging the one or more code blocks of each machine-level intermediate representation with corresponding one or more code blocks of each other machine-level intermediate representation.

This aspect provides the potential benefit of increasing optimization opportunities for the machine-level optimization tool to optimize the machine-level code by generating a machine-level intermediate representation.

In this aspect, additionally or alternatively, the method does not include storing higher than machine-level intermediate representations of each code file of the source code in memory, and the method does not include performing link-time optimization using the higher than machine-level intermediate representations of each code file of the source code.

This aspect provides the potential benefit of increasing efficiency in memory utilization and resource consumption by performing whole program optimizations for machine-level intermediate representations that include operation code for the target machine compared to conventional LTO techniques that use higher-level intermediate representations.

Another aspect provides a computer device (10) comprising a processor (12) configured to execute an application program (38) that generates a source code (30) for a program, wherein the source code (30) includes at least two code files (32), and execute a just-in-time compiler (18) configured to compile the source code (30) for the program at run-time of the application program (38). The just-in-time compiler (18) is configured to receive the source code (30) for the program, process the source code (30) for the program to generate a machine-level code file (80) for each of the at least two code files (32) of the source code (30), generate control flow graph data (82) for each machine-level code file (80) generated for the at least two code files (32) of the source code (30), generate a machine-level intermediate representation (84) for each machine-level code (80) file using a respective machine-level code file (80) and the generated control flow graph data (82) for that machine-level code file (80), merge the machine-level intermediate representations (84) into a merged machine-level intermediate representation (86), perform machine-level optimizations on the merged machine-level intermediate representation (86) and output an optimized merged machine-level intermediate representation (90), and generate an executable file (34) from the optimized merged machine-level intermediate representation (90). The processor (12) is further configured to execute the executable file (34) compiled from the source code (30) of the program during run-time of the application program (38).

This aspect provides the potential benefits of achieving a lower memory footprint and computational overhead than conventional LTO techniques that perform optimizations on high-level IRs at link-time. The lower memory footprint and computational overhead provided by this aspect may provide the potential benefits of increased efficiency and performance of just-in-time compilation that may be used for shader programs and other types of programs that are compiled at run-time.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer device comprising:
 a processor configured to execute instructions that include:
   a compiler configured to receive a source code for a program including at least a first code file and a second code file, and process the source code for the program to generate:
     a first machine-level code file for the first code file; and
     a second machine-level code file for the second code file; a control flow graph generator configured to generate:
     first control flow graph data for the first machine-level code file; and
     second control flow graph data for the second machine-level code file;
   a machine-level intermediate representation generator configured to generate:
     a first machine-level intermediate representation for the first machine-level code file using the first control flow graph data generated for the first machine-level code file; and
     a second machine-level intermediate representation for the second machine-level code file using the second control flow graph data generated for the second machine-level code file;
   a machine-level intermediate representation merger tool configured to merge the first machine-level intermediate representation and the second machine-level intermediate representation into a merged machine-level intermediate representation; and
   a machine-level optimization tool configured to perform machine-level optimizations on the merged machine-level intermediate representation and output an optimized merged machine-level intermediate representation.

2. The computer device of claim 1, wherein the instructions executed by the processor further include an executable tool configured to generate an executable file from the optimized merged machine-level intermediate representation.

3. The computer device of claim 1, wherein the processor is configured to:
 execute an application program that generates the source code for the program at run-time; and,
 execute the instructions for the compiler, the control flow graph generator, the machine-level intermediate representation generator, the machine-level intermediate representation merger tool, and the machine-level optimization tool at run-time of the application program.

4. The computer device of claim 3, wherein the program is a shader program that is generated at run-time of the application program.

5. The computer device of claim 1, wherein the first machine-level intermediate representation and the second machine-level intermediate representation are generated by the machine-level intermediate representation generator with single static assignment.

6. The computer device of claim 1, wherein each of the first machine-level code file and the second machine-level code file includes a plurality of operation code.

7. The computer device of claim 6, wherein to generate the first machine-level intermediate representation for the first machine-level code file and to generate the second machine-level intermediate representation for the second machine-level code file, the machine-level intermediate representation generator is configured to organize the plurality of operation code into one or more code blocks based on the first control flow graph data for the first machine-level code file or the second control flow graph data for the second machine-level code file.

8. The computer device of claim 7, wherein to merge the first machine-level intermediate representation and the second machine-level intermediate representation, the machine-level intermediate representation merger tool is configured to merge the one or more code blocks of the first machine-level intermediate representation with the one or more code blocks of the second machine-level intermediate representation.

9. The computer device of claim 1, wherein the instructions executed by the processor further include a register allocator configured to:
    determine a plurality of physical registers that have been allocated to each of the first machine-level intermediate representation and the second machine-level intermediate representation; and
    assign a plurality of virtual registers for the plurality of physical registers that have been allocated to each of the first machine-level intermediate representation and the second machine-level intermediate representation.

10. The computer device of claim 9, wherein the register allocator is further configured to:
    determine one or more virtual registers that have been assigned to the optimized merged machine-level intermediate representation; and
    allocate one or more physical registers to the optimized merged machine-level intermediate representations based on the determined one or more virtual registers.

11. The computer device of claim 1, wherein the compiler does not store higher than machine-level intermediate representations of the first code file and the second code file of the source code in memory, and does not perform link-time optimization using the higher than machine-level intermediate representations of the first code file and the second code file of the source code.

12. A method comprising:
    at processor of a computer device:
        receiving a source code for a program including at least a first code file and a second code file;
        processing the source code for the program to generate a first machine-level code file for the first code file and a second machine-level code file for the second code file;
        generating first control flow graph data for the first machine-level code file and second control flow graph data for the second machine-level code file;
        generating a first machine-level intermediate representation for the first machine-level code file using the first control flow graph data and a second machine-level intermediate representation for the second machine-level code file using the second control flow graph data;
        merging the first machine-level intermediate representation and the second machine-level intermediate representation into a merged machine-level intermediate representation; and
        performing machine-level optimizations on the merged machine-level intermediate representation to output an optimized merged machine-level intermediate representation.

13. The method of claim 12, further comprising generating an executable file from the optimized merged machine-level intermediate representation.

14. The method of claim 12, wherein the method is performed at run-time of an application program that generates the source code for the program.

15. The method of claim 14, wherein the program is a shader program that is generated at run-time of the application program.

16. The method of claim 12, wherein each of the first machine-level code file and the second machine-level code file includes a plurality of operation code.

17. The method of claim 16, wherein generating the first machine-level intermediate representation and the second machine-level intermediate representation includes organizing the plurality of operation code into one or more code blocks based on the first control flow graph data or the second control flow graph data.

18. The method of claim 17, wherein merging the first machine-level intermediate representation and the second machine-level intermediate representation includes merging the one or more code blocks of the first machine-level intermediate representation with the one or more code blocks of the second machine-level intermediate representation.

19. The method of claim 12, wherein the method does not include storing higher than machine-level intermediate representations of the first code file and the second code file of the source code in memory, and the method does not include performing link-time optimization using the higher than machine-level intermediate representations of the first code file and the second code file of the source code.

20. A computer device comprising:
    a processor configured to:
        execute an application program that generates a source code for a program, wherein the source code includes at least a first code file and a second code file;
        execute a just-in-time compiler configured to compile the source code for the program at run-time of the application program, the just-in-time compiler being configured to:
            receive the source code for the program;
            process the source code for the program to generate a first machine-level code file for of the first code file and a second machine-level code file for the second code file;
            generate first control flow graph data for the first machine-level code file and second control flow graph data for the second machine-level code file;
            generate a first machine-level intermediate representation for the first machine-level code file using the first control flow graph data and a second machine-level intermediate representation for the second machine-level code file using the second control flow graph data;

merge the first machine-level intermediate representation and the second machine-level intermediate representation into a merged machine-level intermediate representation;

perform machine-level optimizations on the merged machine-level intermediate representation to output an optimized merged machine-level intermediate representation;

generate an executable file from the optimized merged machine-level intermediate representation; and execute the executable file compiled from the source code of the program during run-time of the application program.

* * * * *